G. DORFFEL.
RESILIENT WHEEL.
APPLICATION FILED AUG. 30, 1912.

1,070,949.  Patented Aug. 19, 1913.

WITNESSES
C. K. Reichenbach.
A. L. Kitchin.

INVENTOR
George Dorffel
BY
ATTORNEYS

UNITED STATES PATENT OFFICE.

GEORGE DORFFEL, OF OAKLAND, CALIFORNIA.

RESILIENT WHEEL.

1,070,949.

Specification of Letters Patent.

Patented Aug. 19, 1913.

Application filed August 30, 1912. Serial No. 717,899.

*To all whom it may concern:*

Be it known that I, GEORGE DORFFEL, a citizen of the United States, and a resident of Oakland, in the county of Alameda and State of California, have invented a new and Improved Resilient Wheel, of which the following is a full, clear, and exact description.

This invention relates to improvements in resilient wheels, and particularly to a resilient wheel adapted for use on trucks though capable of being used for any desired purpose.

The object in view is to provide an improved construction wherein the parts are made substantially as duplicates so that any number may be assembled in a single wheel and thus present a wheel of any desired strength for use in trucks or for any other form of vehicle.

A further object of the invention is to provide a plurality of resilient members, as for instance springs and rubber cushions, and a surrounding and co-acting spider and frame structure which will hold the resilient members properly in place and present a substantially rigid structure having a resilient radial action.

In carrying out the objects of the invention, a central spider structure is provided which may be formed of one or more layers and which co-acts with a rim carrying a plurality of cushioning members surrounded by coil springs. Mounted on the outer cushioning members and coil springs is a second rim designed to carry a tire structure of any preferred form. Rigidly connected with the second rim are a pair of side plates having inwardly extending projections to which are secured cross braces adapted to co-act with suitable springs and cushioning members. By this construction and arrangement there is provided an inner wheel structure and an outer wheel structure acting simultaneously for causing a resilient support for the hub on which, of course, the vehicle to which the wheel is attached is mounted.

A practical embodiment of the invention is represented in the accompanying drawings forming a part of this specification in which similar characters of reference indicate corresponding parts in all the views.

Figure 1:
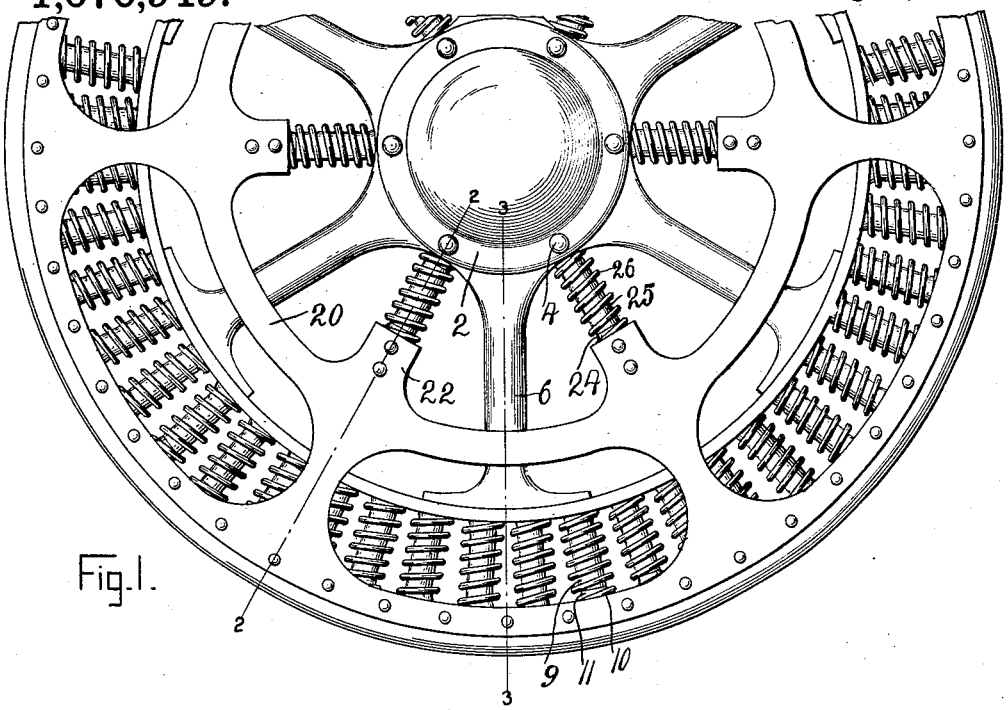
Figure 2:
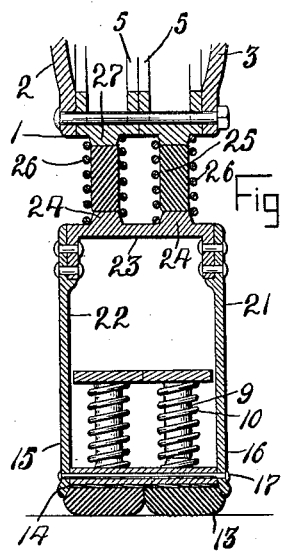
Figure 3:
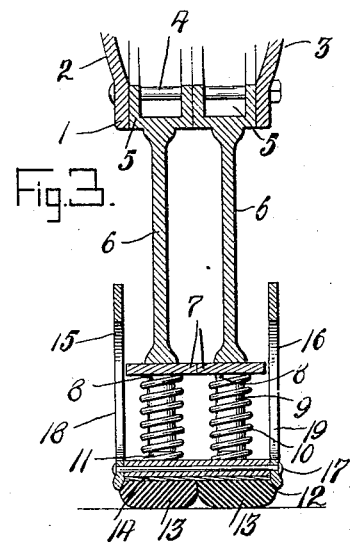

Figure 1 is a side elevation of a wheel embodying the invention, certain parts being broken away; Fig. 2 is a section through Fig. 1 on the line 2—2; and Fig. 3 is a section through Fig. 1 on the line 3—3.

Referring to the accompanying drawings by numerals, 1 indicates a hub structure of any kind, as for instance plates 2 and 3 held in place by suitable bolts 4. Arranged between the plates 2 and 3 are circular channel shaped members 5 held in place by the bolts 4. Any desired number of channel shaped members 5 may be placed between the plates 2 and 3 according to the strength of wheel desired, and radiating outwardly from the channel shaped members 5 are a plurality of spokes 6 carrying at their outer ends a rim 7. Preferably rim 7 is rigidly secured to the respective spokes 6. At suitable places on the rim 7 raised portions or projections 8 are provided, on which are mounted rubber cushioning members 9 surrounded by coil springs 10 held in place by the projections 8 and by suitable projections 11 extending from the outer rim 12. The outer rim 12 has arranged thereon one or more tires 13 of any desired construction. If desired a supporting band 14 may be provided between the rim 12 and tires 13. Rigidly connected with the rim 12 are side plates 15 and 16, the same being held in place by any desired number of bolts 17 passing transversely through the rim 12. The plates 15 and 16 are provided with a plurality of apertures 18 and 19 for reducing the weight of the plates without injuring the strength thereof for the purpose desired, namely for retaining plates for the rim 7 and for presenting bracing members 20 and spokes 21 and 22. The spokes 21 and 22 are connected by cross bars 23 having raised portions 24 on which are mounted rubber cushioning members 25 surrounded by springs 26 held in place by the raised member 24 and raised members 27 projecting from the channel shaped members 5.

By thus constructing a substantially spider-shaped inner frame-work and a pair of outer guiding plates, a wheel may be built up of any desired number of members 5, as for instance two, as shown in the drawings. This number is appropriate for comparatively light work and may be easily removed and replaced whenever desired so that injured or faulty members may be eliminated as soon as such injury or fault is ascertained.

Having thus described my invention I claim as new and desire to secure by Letters Patent:—

1. In a resilient wheel of the class described, hub plates, a spider rigidly secured to the hub plates and formed with radiating spokes, a rim rigidly connected with the outer ends of said spokes, resilient means mounted on said rim, a second rim connected to the outer end of said means, and limiting their outward movement, a pair of guiding plates for both of said rims, and cushioning means acting on said guiding plates for resiliently supporting said second rim independent of said resilient means.

2. In a resilient wheel, a hub, a central spider structure connected with said hub, a rim connected with said spider structure, a plurality of resilient means connected with said rim and extending radially therefrom, said means comprising rubber cushioning members and coil springs surrounding said cushioning members, an outer rim engaging the outer ends of said cushioning members and said springs, a pair of guiding plates connected rigidly with said outer rim and engaging said inner rim whereby the guiding plates are held properly in place by said inner rim, a plurality of cross bars connected to the inner portions of said guiding plates, a cushioning member connecting each of said cross bars and said spider structure, and a coil spring surrounding each of said last mentioned cushioning members.

3. In a resilient wheel, a hub, a central spider structure connected with said hub, a rim connected with said spider structure, a plurality of resilient means connected with said rim and extending radially therefrom, an outer rim engaging the outer ends of said resilient means, a pair of guiding plates connected rigidly with said outer rim and engaging said inner rim whereby the guiding plates are held properly in place by said inner rim, a plurality of cross members connected with the inner portion of said guiding plates, and resilient cushioning means connected to each of said cross members and to said spider structure.

4. In a resilient wheel, a hub, a central spider structure connected with said hub, a rim connected with said spider structure, a plurality of resilient means connected with said rim and extending radially therefrom, said means comprising rubber cushioning members and coil springs surrounding said cushioning members, an outer rim engaging the outer ends of said resilient means, a pair of guiding plates connected with said outer rim and engaging said inner rim whereby the guiding plates are held properly in place by said inner rim, and a second set of resilient means acting on said guiding plates and on said spider structure for assisting in resiliently supporting said outer rim.

In testimony whereof I have signed my name to this specification in the presence of two subscribing witnesses.

GEORGE DORFFEL.

Witnesses:
  B. P. ZOLEEL,
  GEORGE H. HOLLIDGE.

---

Copies of this patent may be obtained for five cents each, by addressing the "Commissioner of Patents, Washington, D. C."